United States Patent [19]

Aronne

[11] Patent Number: 5,104,066

[45] Date of Patent: Apr. 14, 1992

[54] DROGUE CHUTE SPEED MODE SELECTOR

[75] Inventor: Armand Aronne, Massapequa, N.Y.

[73] Assignee: Grumman Aerospace Corporation, Bethpage, N.Y.

[21] Appl. No.: 518,442

[22] Filed: May 3, 1990

[51] Int. Cl.[5] .................... B64D 17/64; B64D 25/112
[52] U.S. Cl. .............. 244/122 AE; 244/141; 244/152; 73/862.65; 73/184
[58] Field of Search ............. 244/140, 141, 152, 147, 244/149, 122 A, 122 AE, 122 AF, 150; 73/861.76, 861.24, 178 R, 826.61, 189, 184, 862.65

[56] References Cited

U.S. PATENT DOCUMENTS

| | | | |
|---|---|---|---|
| 2,795,134 | 6/1957 | Weber et al. ..................... | 73/862.65 |
| 2,969,212 | 1/1961 | Martin ................................ | 244/141 |
| 3,038,407 | 6/1962 | Robertson et al. ................ | 244/150 |
| 3,067,973 | 12/1962 | Halsey et al. ..................... | 244/122 A |
| 3,191,892 | 6/1965 | Fuller et al. ...................... | 244/122 AE |
| 4,527,758 | 7/1985 | Ayoub et al. ..................... | 244/122 AE |
| 4,709,885 | 12/1987 | Martin .............................. | 244/149 |

FOREIGN PATENT DOCUMENTS 37642 10/1922 Norway ............................... 73/184

Primary Examiner—Galen Barefoot
Attorney, Agent, or Firm—Pollock, VandeSande & Priddy

[57] ABSTRACT

An ejected pilot's seat is provided with a drogue chute anchored to the seat by means of a bridle. The bridle includes a strap having redundant load cells parallel connected in redundant fashion. The load cells measure tension in the strap. Data from the load cell is conducted through the bridle to a microprocessor contained within the seat. The microprocessor includes look-up tables for correlating tensile load in the strap to forward velocity of the ejected pilot. Upon acquisition of a preselected optimum velocity, the drogue chute is released and a main chute is deployed to increase the likelihood of a safe descent to the ground.

5 Claims, 3 Drawing Sheets

DROGUE CHUTE SPEED MODE SELECTOR

FIELD OF THE INVENTION

The present invention relates to an ejected aviator seat drogue chute deployment system, and more particularly to a velocity sensor utilizing a load cell inserted in the bridle of the drogue chute.

BACKGROUND OF THE INVENTION

In modern military aircraft pilot ejection seats are provided to quickly free a pilot from a disabled aircraft. Usually, upon ejection a small drogue chute is deployed to slow the ejected pilot to a satisfactorily safe velocity prior to deployment of a main chute. A number of systems have been employed in the prior art for detecting the velocity of an ejected pilot. A typical system includes lever-mounted pitot tubes which extend from the head portion of an ejected seat during an initial ejection phase existing in the time interval between drogue chute deployment and main chute deployment, the latter to occur at about 250 knots. The pitot tubes of the prior art measure the dynamic pressure exerted on the pitot tube as a function of forward velocity. However, since the pressure readings of the pitot tube are altitude sensitive, it is necessary to provide an altimeter. With the benefit of a microprocessor (stored in the seat), look-up tables can handle the dynamic pressure and altitude readings for correlating these to actual seat velocity.

The disadvantages of the prior art pitot tube systems are several. In the first place the pitot tubes are moved to an operative position after deployment and the means for moving the pitot tubes consists of a rather complicated spring and linkage system. Since dual pitot tubes are provided for normal redundancy, this approach becomes costly and involves quite a bit of mechanics which decreases reliability. Further, an accurate reading of dynamic pressure requires that the deployed seat be right side up so that the inlet of the pitot tube correctly faces the forward position. It is quite common for the seat to become somewhat positionally offset after ejection. As a result, the pitot tubes will not allow the accurate computation of forward velocity.

BRIEF DESCRIPTION OF THE PRESENT INVENTION

The present invention eliminates the need for linkage-mounted pitot tubes by adding a load cell to the seat drogue chute bridle and measuring the load on the cell after pilot ejection. The measured load will be independent of altitude and directly corresponds to forward velocity of an ejected pilot. Accordingly, simplified look-up tables may be stored in a microprocessor to quickly and accurately determine velocity. Further, since the load cell may be connected in line with the bridle, there is no need for complicated spring and linkage mechanisms such as employed by the prior art pitot tube systems.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
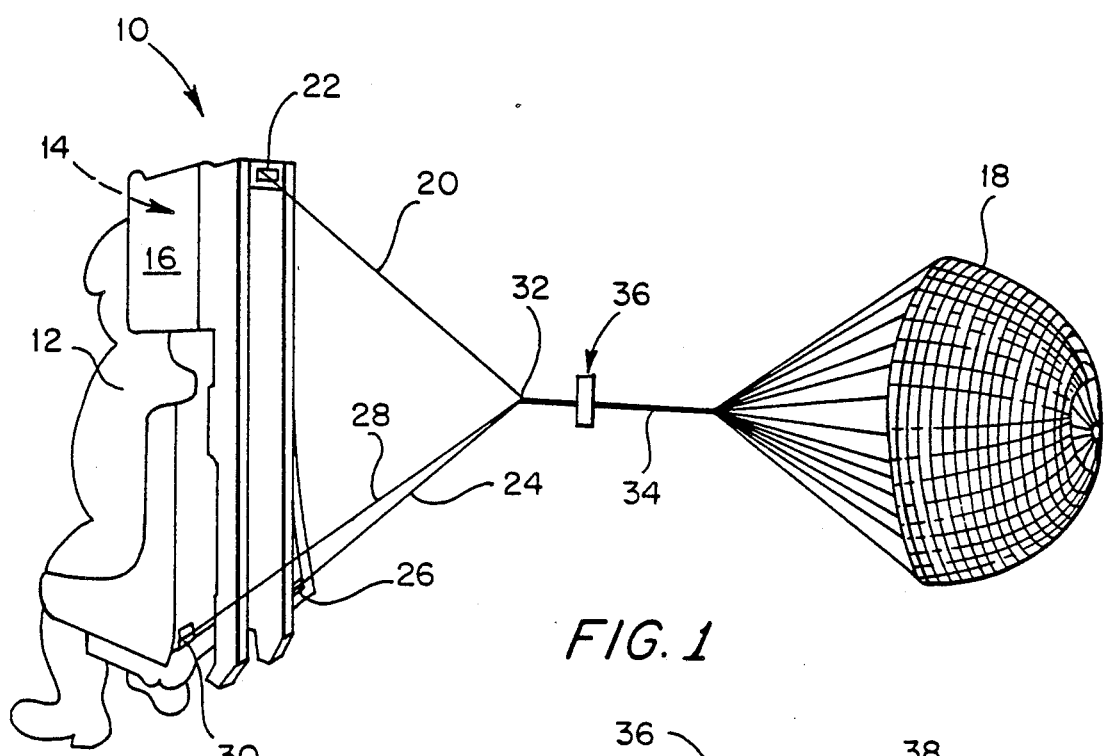
FIG. 1 is a perspective view illustrating the positioning of the present invention in a drogue chute bridle after the latter has been deployed as a result of pilot ejection.

FIG. 1 is a view illustrating the normal pilot seat position shortly after a pilot 12 has ejected. The figure illustrates a first employed drogue chute 18 which is normally stored (14) within head box 16 of the seat. The drogue chute is immediately deployed upon ejection and serves to stabilize and slow the pilot to an appropriately speed, typically 250 knots, before a main chute becomes deployed from head box 16 after being stored therein, as indicated by reference numeral 14.

The drogue chute 18 is secured to the rearward portion of the seat by means of a bridle including an upper strap 20 connected to a release unit 22 and two lower straps 24 and 28, respectively connected to rear release units 26 and 30. The bridle straps are joined at point 32 to a bridle extender strap 34, the end of which is secured to the attachment point of drogue chute 18. The velocity sensor of the present invention is generally indicated by reference numeral 36 and serves to measure the tension in the extender strap 34 which is a function of the velocity of seat 10.

Figure 2:
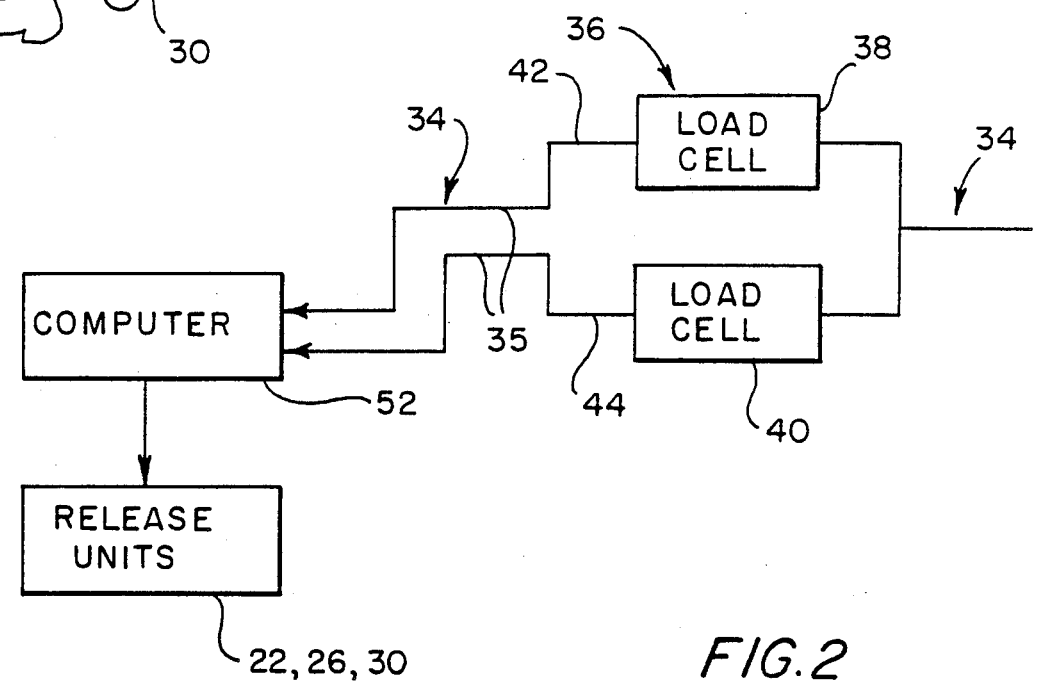
FIG. 2 is a simplified schematic diagram illustrating the connection of parallel redundant load cells connected in line with the drogue chute bridle.

FIG. 2 indicates that the velocity sensor 36 is principally comprised of two conventional load cells 38 and 40 connected along parallel branches 42 and 44 of the extender strap 34. Two load cells are employed for redundancy and the cells are typically piezoelectric devices. As is the case with the prior art, a microprocessor 52 is enclosed within seat 10 for processing load data obtained from the load cells 38 and 40. In a preferred embodiment of the present invention, one or more of the bridle straps (20, 24, 28) as well as the extender strap 34 have metal wires 35 extending along the length thereof for conducting electrical signals from the load cells to the microprocessor. The microprocessor stores look-up tables for correlating load and velocity.

When the ejected pilot's velocity decreases to a pre-selected level, typically 250 knots, the release units 22, 26, and 30 become operative to free the drogue chute simultaneous with the deployment of a main chute from head box 16.

Figure 3C:
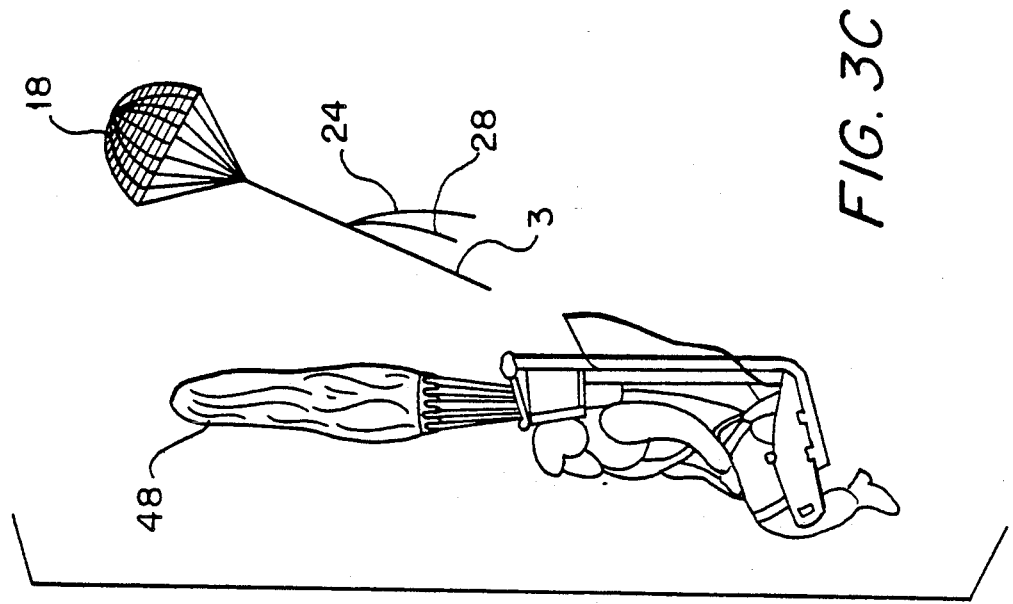
FIGS. 3A-3E illustrate a sequence of pilot ejection from an aircraft.
Figure 3A:
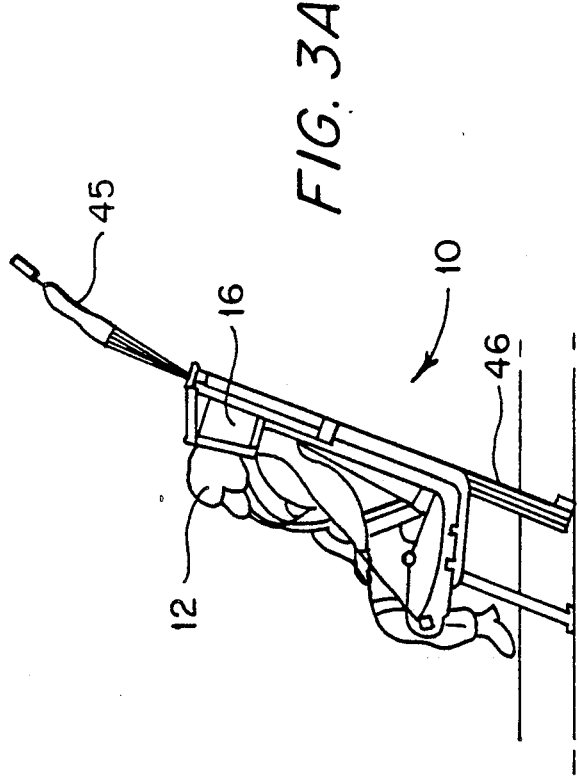
Figure 3B:
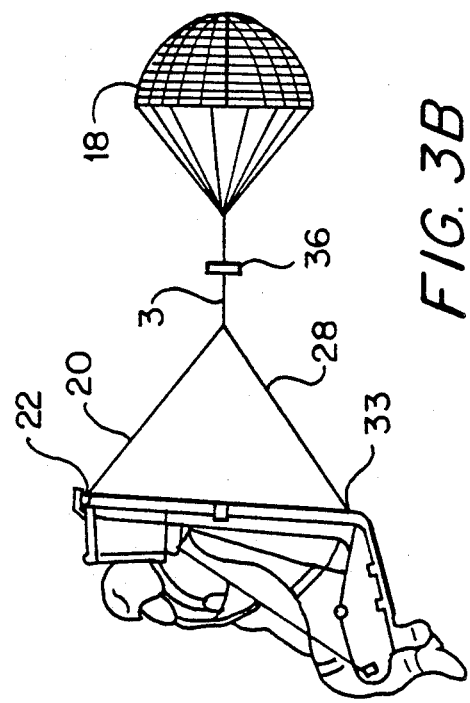

FIGS. 3A-E illustrate a typical high altitude ejection sequence. In FIG. 3A a pilot 12 has his seat 10 ejected by a conventional catapult 46. Simultaneous with the ejection from an aircraft cockpit, a drogue deployment gun fires releasing drogue chute rocket 45 which clears the area to allow deployment of the enclosed drogue chute 18, as shown in FIG. 3B. In the latter-mentioned figure, the drogue chute begins to stabilize and slow the pilot.

Figures 3D, 3E:
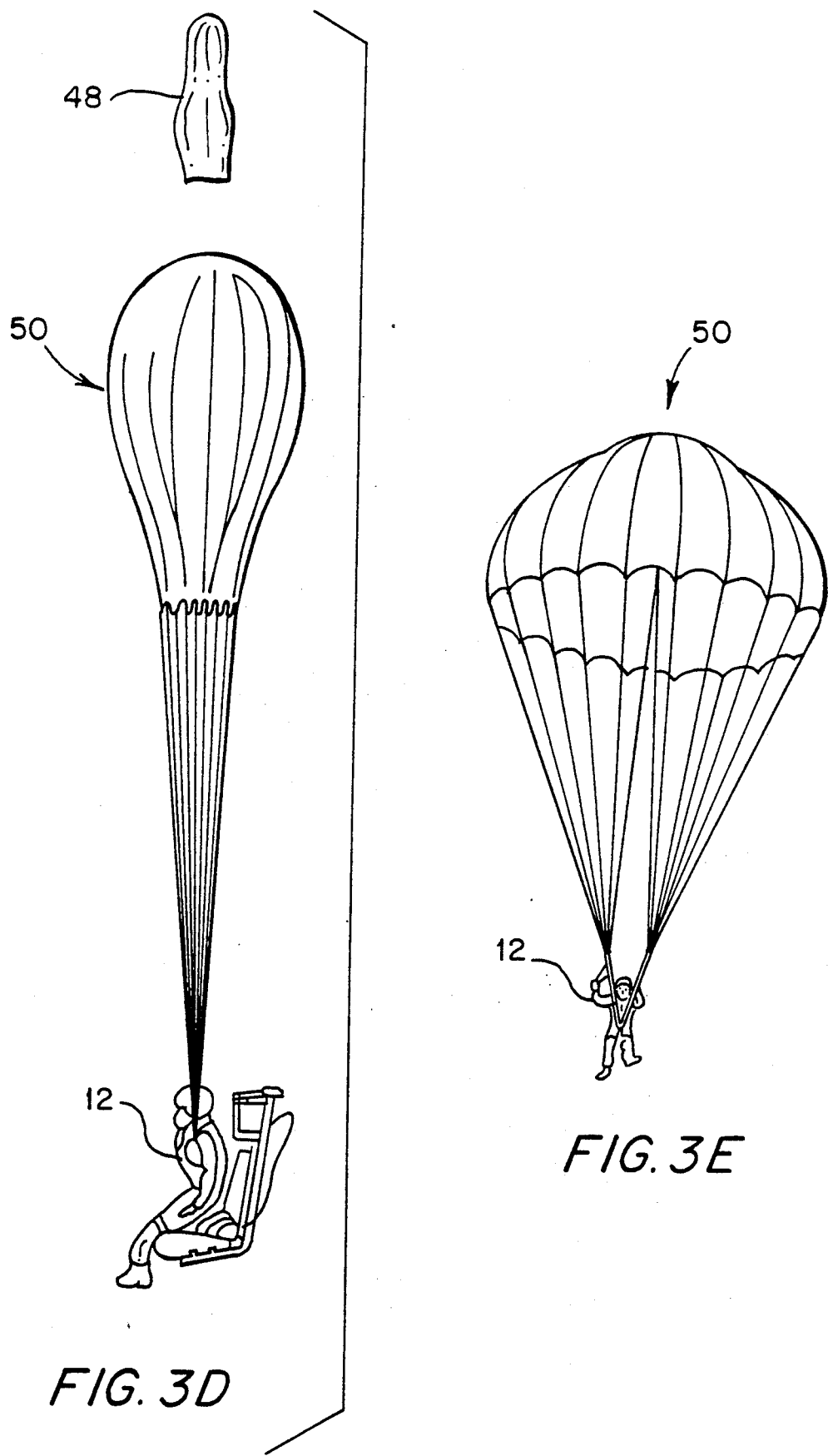

During the phase shown in FIG. 3C, the velocity sensor 36, comprised of the load cells 38 and 40, has detected a prescribed optimum velocity for deployment of the main chute. Typically, this is approximately 250 knots. Actuation of the release units (22, 26, and 30) as previously mentioned releases the drogue chute and simultaneous therewith, the main parachute deployment rocket 48 operates thereby deploying a main chute 50, as shown in FIG. 3D.

An automatic conventional mechanism releases the pilot 12 from the seat so that there is a normal parachute descent to the ground.

Thus, as explained, the present invention offers an improved velocity sensor for reliably and simply permitting the sensing of an optimum preset velocity for release of a pilot's drogue chute and deployment of a main chute. By accurately determining the optimum velocity, the likelihood of a safe parachute descent is increased. With this speed sensor system, the parachute can be deployed at a higher velocity if ground impact is imminent.

It should be understood that the invention is not limited to the exact details of construction shown and described herein for obvious modifications will occur to persons skilled in the art.

I claim:

1. In a parachute deployment system having drogue and main chutes stored in a pilot's seat, a velocity-sensing circuit comprising:
    at least one load cell mechanically connected in line with a drogue extender strap for conditioning an electrical signal corresponding to tension in said deployed drogue extender strap;
    computing means for converting the electrical signal to corresponding velocity measurements; and
    conductor means forming part of the extender strap for conducting the signals to the computing means.

2. The system set forth in claim 1 together with means for releasing a secured deployed drogue chute from a pilot's seat upon the pilot's deceleration to a preselected velocity, the computing means generating a control signal to the release means when the preselected velocity is converted.

3. The system set forth in claim 1 wherein a plurality of load cells are parallel connected in line with the extender strap for redundantly measuring tension in the extender strap, multiple parallel conductors being provided in the extender strap to conduct individual signals for corresponding load cells to the computing means.

4. The system set forth in claim 1 wherein the computing means includes a look-up table for correlating tension measurement with corresponding forward ejection velocity.

5. A velocity sensor for a flying object comprising:
    a drogue parachute bridled to the object;
    a load cell mechanically connected in line with a chute bridle for measuring bridle tension;
    means located in the object for computing velocity as a function of tension;
    conductor means forming part of the bridle for conducting electrical signals from the load cell to the computing means;
    and means for releasing the drogue parachute when a preselected velocity is computed.

* * * * *